(12) United States Patent
Lindqvist et al.

(10) Patent No.: US 7,343,487 B2
(45) Date of Patent: Mar. 11, 2008

(54) DATACAST DISTRIBUTION SYSTEM

(75) Inventors: Markus Lindqvist, Helsinki (FI); Kai-Uwe Prokki, Espoo (FI); Markku Soinio, Espoo (FI); Dominique Müller, Helsinki (FI)

(73) Assignee: Nokia Corporation, Espoo (FI)

( * ) Notice: Subject to any disclaimer, the term of this patent is extended or adjusted under 35 U.S.C. 154(b) by 873 days.

(21) Appl. No.: 09/974,554

(22) Filed: Oct. 10, 2001

(65) Prior Publication Data

US 2003/0068046 A1    Apr. 10, 2003

(51) Int. Cl.
*H04L 9/00* (2006.01)
(52) U.S. Cl. .................. 713/162; 380/270; 380/271
(58) Field of Classification Search .............. 725/32, 725/114, 144; 370/345; 713/162; 380/270, 380/271; 384/14; 381/311; 455/3
See application file for complete search history.

(56) References Cited

U.S. PATENT DOCUMENTS

| | | | |
|---|---|---|---|
| 4,429,385 A | 1/1984 | Cichelli et al. | |
| 5,128,776 A | 7/1992 | Scorse et al. | |
| 5,717,925 A | 2/1998 | Harper et al. | |
| 5,729,549 A * | 3/1998 | Kostreski et al. | 370/522 |
| 5,745,694 A | 4/1998 | Egawa et al. | |
| 5,757,907 A | 5/1998 | Cooper et al. | |
| 5,761,602 A | 6/1998 | Wagner et al. | |
| 5,797,010 A | 8/1998 | Brown | |
| 5,822,324 A | 10/1998 | Kostresti et al. | |
| 5,830,068 A | 11/1998 | Brenner et al. | |
| 5,845,267 A | 12/1998 | Ronen | |
| 5,914,712 A | 6/1999 | Sartain et al. | |
| 5,935,206 A | 8/1999 | Dixon et al. | |
| 5,945,987 A | 8/1999 | Dunn | |
| 5,946,326 A | 8/1999 | Rinne | |
| 6,005,631 A | 12/1999 | Anderson et al. | |
| 6,052,715 A | 4/2000 | Fukui et al. | |
| 6,055,543 A | 4/2000 | Christensen et al. | |
| 6,115,486 A | 9/2000 | Cantoni | |
| 6,157,377 A | 12/2000 | Shah-Nazaroff et al. | |
| 6,160,545 A | 12/2000 | Eyer et al. | |
| 6,169,843 B1 | 1/2001 | Lenihan et al. | |
| 6,212,548 B1 | 4/2001 | DeSimone et al. | |
| 6,226,618 B1 | 5/2001 | Downs et al. | |
| 6,240,416 B1 | 5/2001 | Immon et al. | |
| 6,256,509 B1 | 7/2001 | Tanaka et al. | |
| 6,393,562 B1 | 5/2002 | Maillard | |
| 7,028,071 B1 * | 4/2006 | Slik | 709/201 |
| 2001/0025256 A1 | 9/2001 | Oliphant et al. | |

(Continued)

FOREIGN PATENT DOCUMENTS

AU    199940190 A1    3/2000

(Continued)

OTHER PUBLICATIONS

English language Abstract corresponding to DE 195 09 709.

(Continued)

*Primary Examiner*—Ellen Tran
(74) *Attorney, Agent, or Firm*—Morgan & Finnegan, L.L.P.

(57) ABSTRACT

According to the present invention there is provided a datacast distribution system which allows for the distribution of movies, music, games, application software, and the like using a new or existing terrestrial digital video broadcast (DVB-T) network.

3 Claims, 12 Drawing Sheets

U.S. PATENT DOCUMENTS

| | | | |
|---|---|---|---|
| 2001/0025349 A1 | 9/2001 | Sharood et al. | |
| 2002/0015042 A1 | 2/2002 | Robotham et al. | |
| 2002/0016972 A1 | 2/2002 | Ogawa et al. | |
| 2002/0023270 A1 | 2/2002 | Thomas et al. | |
| 2002/0131387 A1 | 9/2002 | Pitcher et al. | |
| 2003/0002862 A1 | 1/2003 | Rodriguez et al. | |
| 2003/0009380 A1 | 1/2003 | Suzuki et al. | |
| 2003/0050058 A1 | 3/2003 | Walsh et al. | |
| 2005/0028195 A1* | 2/2005 | Feinleib et al. | 725/32 |

FOREIGN PATENT DOCUMENTS

| | | |
|---|---|---|
| DE | 195 09 709 A1 | 9/1995 |
| EP | 0 680 185 A2 | 11/1995 |
| EP | 0 710 017 A2 | 5/1996 |
| EP | 0 745 412 A1 | 12/1996 |
| EP | 0 745 948 A2 | 12/1996 |
| EP | 0 752 787 A1 | 1/1997 |
| EP | 0 802 677 A1 | 10/1997 |
| EP | 0 858 225 A1 | 8/1998 |
| EP | 0 866 614 A1 | 9/1998 |
| EP | 0 873 772 A1 | 10/1998 |
| EP | 0 920 891 A1 | 6/1999 |
| EP | 0 921 657 A1 | 6/1999 |
| EP | 0988 876 A1 | 3/2000 |
| EP | 0 998 145 A1 | 5/2000 |
| EP | 0649 102 B1 | 5/2000 |
| EP | 1 005 885 A1 | 6/2000 |
| EP | 1 026 707 A1 | 8/2000 |
| EP | 1 026 886 A2 | 8/2000 |
| EP | 1 026 892 A1 | 8/2000 |
| EP | 1 026 896 A1 | 8/2000 |
| EP | 1 028 589 A1 | 8/2000 |
| EP | 1 037 461 A2 | 9/2000 |
| EP | 1 037 462 A2 | 9/2000 |
| EP | 1 041 791 A1 | 10/2000 |
| EP | 1 043 911 A2 | 10/2000 |
| EP | 1 043 924 A2 | 10/2000 |
| EP | 1 045 339 A1 | 10/2000 |
| EP | 1 045 582 A1 | 10/2000 |
| EP | 1 045 584 A2 | 10/2000 |
| EP | 1 049 276 A1 | 11/2000 |
| EP | 1 050 328 A1 | 11/2000 |
| EP | 1 052 854 A1 | 11/2000 |
| EP | 1 054 553 A2 | 11/2000 |
| EP | 1 056 279 A1 | 11/2000 |
| EP | 1 059 729 A1 | 12/2000 |
| EP | 1 077 398 A1 | 2/2001 |
| GB | 2 343 809 A | 5/2000 |
| JP | 10-209987 | 8/1998 |
| NZ | 500442 A | 3/2000 |
| WO | WO 95/01058 | 1/1995 |
| WO | WO 95/13681 | 5/1995 |
| WO | WO 96/34486 | 10/1996 |
| WO | WO 97/23052 | 6/1997 |
| WO | WO 98/57718 | 12/1998 |
| WO | WO 99/14775 | 3/1999 |
| WO | WO 99/14874 | 3/1999 |
| WO | WO 99/22512 | 5/1999 |
| WO | WO 99/33076 | 7/1999 |
| WO | WO 99/37048 | 7/1999 |
| WO | WO 99/49663 | 9/1999 |
| WO | WO 99/51030 | 10/1999 |
| WO | WO 00/03482 | 1/2000 |
| WO | WO 00/07361 | 2/2000 |
| WO | WO 00/08848 | 2/2000 |
| WO | WO 00/24195 | 4/2000 |
| WO | WO 00/26813 | 5/2000 |
| WO | WO 00/38430 | 6/2000 |
| WO | WO 00/51057 | 8/2000 |
| WO | WO 00/64177 | 10/2000 |
| WO | WO 00/75779 A2 | 12/2000 |
| WO | WO 00/79831 A1 | 12/2000 |
| WO | WO 01/22632 A1 | 3/2001 |
| WO | WO 01/47257 A1 | 6/2001 |

OTHER PUBLICATIONS

Supplementary European Search Report for EP 02776196.4.

* cited by examiner

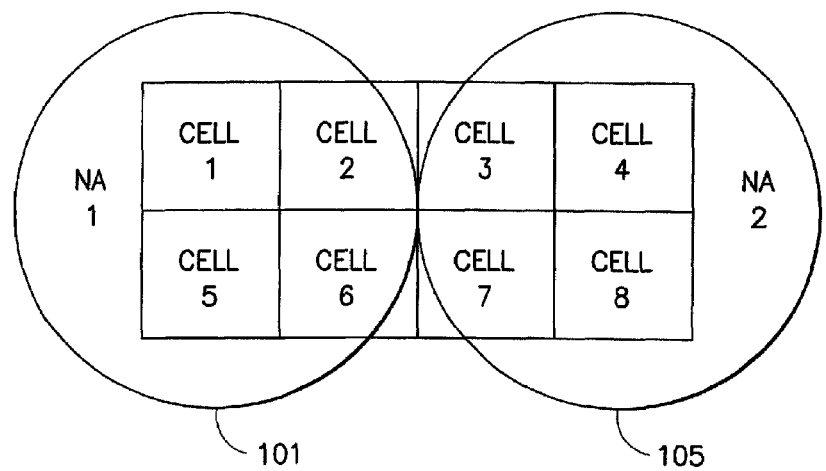

DATACAST DISTRIBUTION SYSTEM

FIELD OF INVENTION

This invention relates to systems and methods for distributing data over a wireless link.

BACKGROUND INFORMATION

Broadcast has an almost century long tradition in radio. Even with TV, the history goes back to 1930's. Broadcasting has been successful throughout the world in bringing both entertainment and information to mass audiences.

The latest step in broadcasting is the digitalization of both radio and TV. Digital radio has not gained much acceptance on the market. However, many hope that digital TV will bring new benefits and services to the consumer and, as a result, generate new revenue streams for the broadcasting industry. The basic concept of the TV service itself has, however, not changed much. Rather, the TV lives on as before even if it has become digital.

In later half of 1990's we saw the boom of the Internet. A whole set new of services and content became available to the consumers during a short, revolutionary and hype intense period. That period introduced e-commerce, Internet Service Providers (ISPs), Portals, eyeballs game, dotcom companies and even the new economy. The developments in both access technologies (e.g. ADSL) and coding technologies (e.g. MPEG4 streaming) has made it possible to bring rich media content like video content to homes via the Internet. Despite of these technology and market breakthroughs media houses have been reluctant to distribute their content via the Internet due to its "free-of-charge" nature and the direct threat of piracy. Internet has also not been able to challenge the role of traditional media as the primary advertisement platform despite is great popularity.

Another development marking major shifts in the 1990's has been the rapid growth of mobile telecommunications globally. Through out the world voice telephony has moved from fixed wireline to mobile wireless. Consumers have an urge for new, mobile non-voice services that operators hope to fulfill with latest developments of technology like GPRS and 3rd Generation UMTS. In Japan DoCoMo by orchestrating the iMode business system and technology platform managed to boost the market with new services, new benefits to both consumers and content providers, and, consequently, with new revenue streams.

SUMMARY OF THE INVENTION

According to the present invention there is provided a datacast distribution system which allows for the distribution of movies, music, games, application software, and the like using a new or existing terrestrial digital video broadcast (DVB-T) network.

BRIEF DESCRIPTION OF THE DRAWINGS

FIG. 1 is a diagram showing the establishment of network areas according to embodiments of the invention.

FIG. 2. is a diagram showing the mapping of calendar dates to day-profiles according to embodiments the invention.

DETAILED DESCRIPTION OF THE INVENTION

According to the present invention there is provided a datacast distribution system (DDS) which allows for the distribution to reception terminals of content such as movies, music, games, software, and the like using a new or existing DVB-T (terrestrial digital video broadcast) network.

Bandwidth Partitioning and Allocation

DVB-T offers a high bandwidth transmission channel wherein delivery is typically multicast. Planning is necessary to make optimum use of this bandwidth.

Bandwidth partitioning and allocation according to one embodiment of the present invention will now be described. A first step may be to define network areas in the DVB-T broadcast network into which the DDS is to be deployed. A network area comprises one or more cells and/or broadcast areas of the DVB-T network. In the example of FIG. 1, network area 1 is comprised of cells 1-4 while network area 2 is comprised of cells 5-8. As will be described in detail below, some content will be designated for "global" distribution, while other content will be designated for distribution to a single network area. All network areas will receive content designated for "global" distribution, whereas content will be designated for transmission only to a certain network area will be received only in that area.

A second step may be to define day-type profiles. Day-types are defined such that any date on the calendar can be assigned to one of the defined day-types. For example, four day-types may be defined: "weekday," "Saturday," "Sunday," and "holiday." In other embodiments more or less day-types may be defined. In certain embodiments a date on the calendar may be assigned to more than one day-type.

A next step may be to map dates to day-types. FIG. 2 continues the above example by showing an exemplary mapping for the second-to-last week of December 2002 wherein each day is mapped to one of the defined day-types. Thus, for example, December 22 is mapped to "Sunday," December 23 to "weekday," and December 25 to "holiday."

Mapping may be done for any amount of time into the future. For example, mapping may be done for each date occurring within the next five years.

Figure 3:
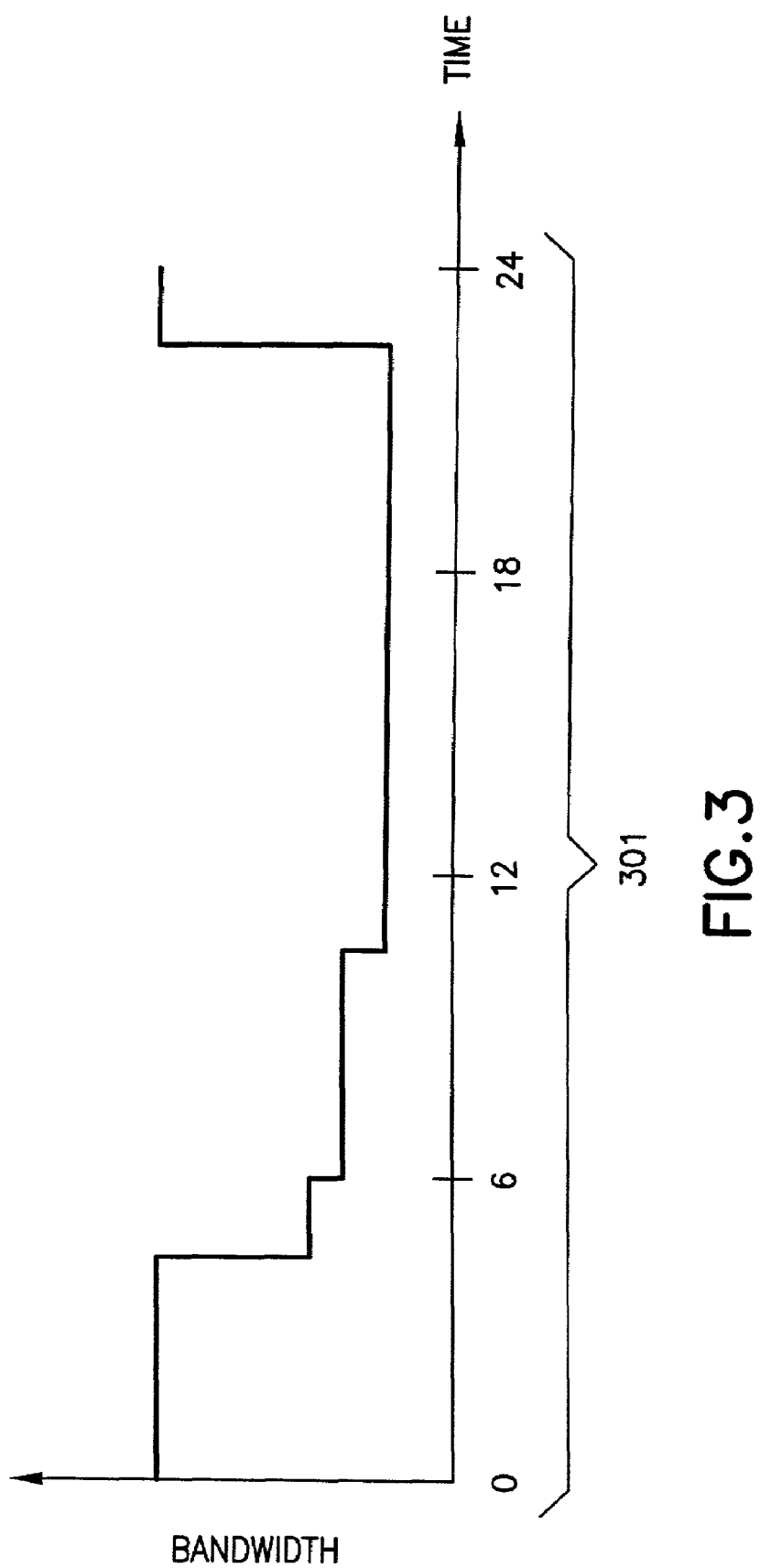
FIG. 3 is a diagram showing an exemplary graphical representation of the recording of the free bandwidth in network area according to embodiments the invention.

Mapping may be done for both a monitoring period and a deployment period. The monitoring period is the period of time during which measurements of free bandwidth are made in the network for the purpose of allocating and partitioning bandwidth, whereas the deployment period is the period of time during which the DDS operates on the network according to the allocations and partitions. For example, when the DDS is deployed in an existing terrestrial DVB broadcast network, there might be a monitoring period of three months. Thus a next stop in bandwidth partition and allocation may be to measure and record free bandwidth in each network area for the monitoring period. FIG. 3, for example, shows an exemplary graphical representation of the recording of the free bandwidth in network area 1 on Jan. 3, 2001.

Figure 4:
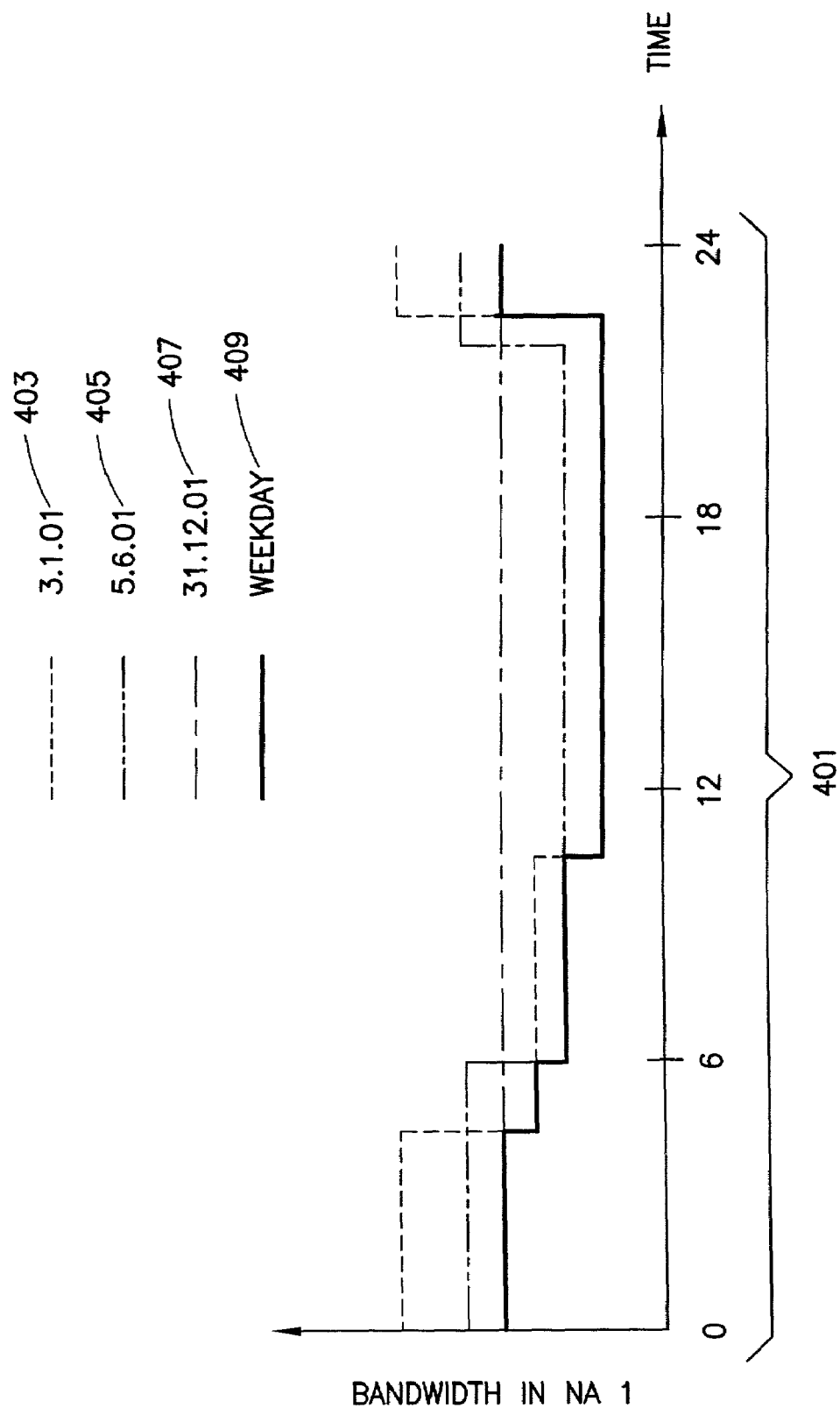
FIG. 4 shows an exemplary preliminary local bandwidth availability for day-type "weekday" in a network area according to embodiments of the invention.

Next, a preliminary local network availability may be defined for each day-type in each network area. According to one embodiment, this may be done by choosing a number of days of the monitoring period that were mapped to a particular day-type, overlapping the graphical representations of free bandwidth corresponding to those chosen days, and performing an mathematical operation. For example, in FIG. 4 the preliminary local bandwidth availability for day-type "weekday" in network area 1 is defined by overlaying graphs of the free bandwidth recordings for three days of the monitoring period that were defined as weekdays, plotting the mathematical minimum of the three graphs, and defining that minimum to be the preliminary bandwidth availability for day-type weekday in network area 1.

Figure 5:
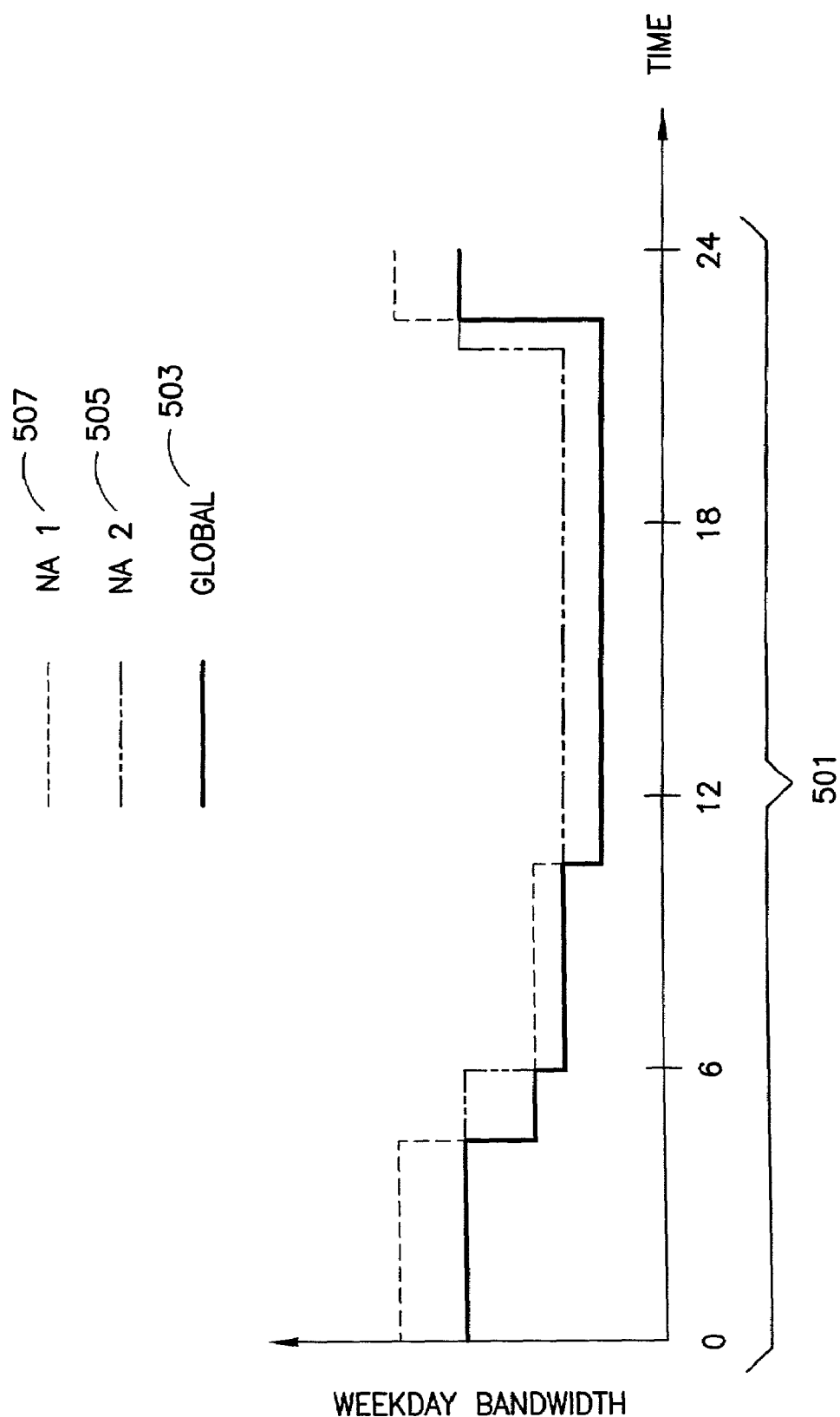
FIG. 5 shows an exemplary global network availability for the day-type "weekday" according to embodiments of the invention.

After defining the preliminary local network availability for each day-time in each network area, a final global network availability may be defined for each day-type. According to one embodiment, the final global network availability is defined for a particular day-type by overlaying graphs of the preliminary network availabilites for that day-type from the various network areas, performing a mathematical operation, and plotting the result. For example, in FIG. 5 the global network availability for the day-type "weekday" is defined in a DDS with two network areas by overlaying the graphs of the network area 1 and network area 2 preliminary network availabilities for day-type weekday, and considering the mathematical minimum of the overlaid graphs to define the global network availability for day-type "weekday."

Figure 6:
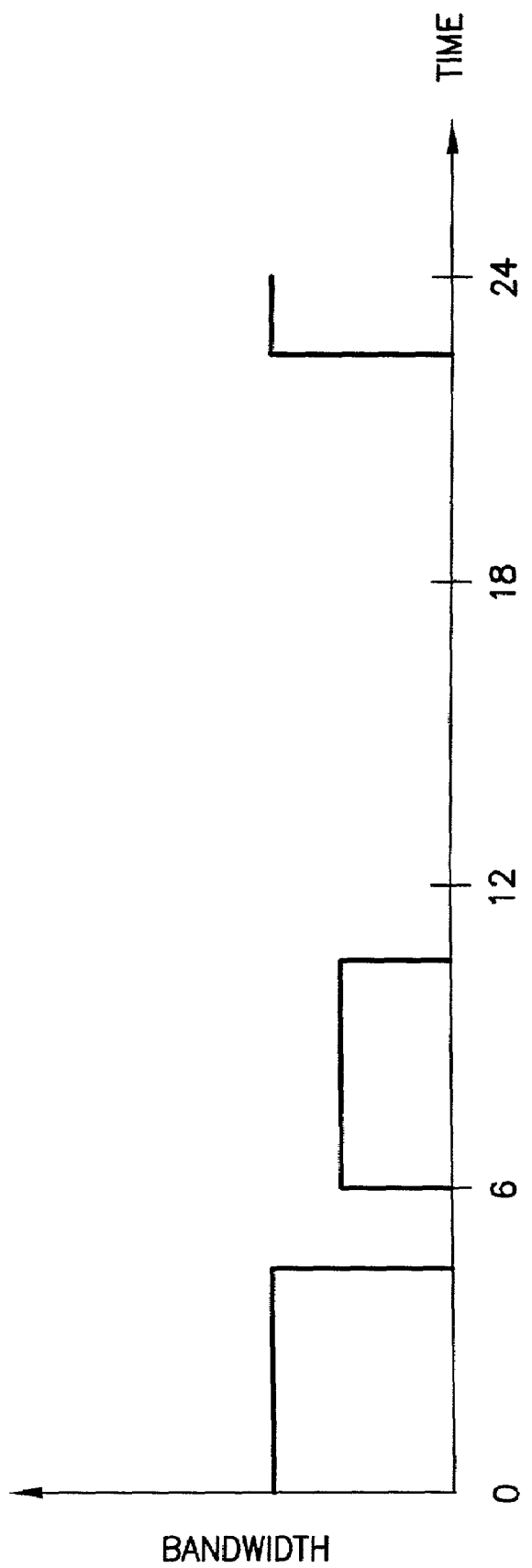
FIG. 6 shows an exemplary final local network availability for day-type weekday in a particular network area according to embodiments of the invention.

As a next step, a final local network availability may be defined for each day-type in each network area. The final local network availability for a particular network area and day-type may be defined by taking the preliminary local network availability for that network area and day-type, and subtracting from it the final global network availability for that day-type. This is shown by example in FIG. 6 where the final local network availability for network area 1 and day-type weekday was defined by graphically subtracting the final global network availability graph for day-type weekday from the preliminary local network availability graph for day-type weekday in network area 1.

With the final local and final global network availabilites defined, a next step may to be to perform partitioning of the available bandwidth into several quality of service (QoS) classes. According to one embodiment of the present invention, six QoS classes are used. The first of the six classes is "global/constant" (GC). This class provides a constant bandwidth that is available 24 hours a day, 7 days a week. This class could be used for purposes such as delivering streaming content, service announcements, access keys, or the like to all network areas.

The second of the six classes is "global/time bound" (GT). This class is used for distribution of content to all network areas, and provides blocks of various bandwidths and time durations. Particular GT blocks are offered to service providers who wish for scheduled delivery. For example, a particular GT block might be offered that provides 12 Mbit/s for 12 minutes starting at 6 p.m. on Nov. 12, 2003.

The third of the six classes is "global/dynamic priority". Like GT, GD is used for distribution to all network areas and provides blocks of various bandwidths and time durations. However, particular GD blocks are not offered to content providers. Because the content provider cannot choose a particular GD block, although these blocks are employed to offer delivery before a specified date, they tend not to be employed to offer delivery at a specific time. Instead, a content provider may be offered transmission before a stated date using a block offering a particular bandwidth. If the content provider accepts, the DDS or an employee thereof decides which of the blocks matching the criteria will be given to the content provider. Thus, unlike GT blocks, the content provider does not choose a particular block; instead the choice is made by for the content provider.

For example, there might be seven GD blocks offering 12 Mbit/s for 12 minutes between 12 Oct. 2002 and 13 Oct. 2002, each of the blocks providing for transmission over the wireless link at a different particular time. A content provider seeking GD blocks might accept an offering of 12 Mbit/s for 12 minutes between 12 Oct. 2002 and 13 Oct. 2002. However the content provider would not know which of the seven blocks he would actually be assigned. Instead this decision would be made by an employee and/or computer of the DDS. For example, a DDS computer could be programmed to make this decision in a way that optimizes the use of available bandwidth. Thus while the content provider would know that his distribution would occur before October $13_{th}$, he would not know the actual time of distribution.

Figure 7:
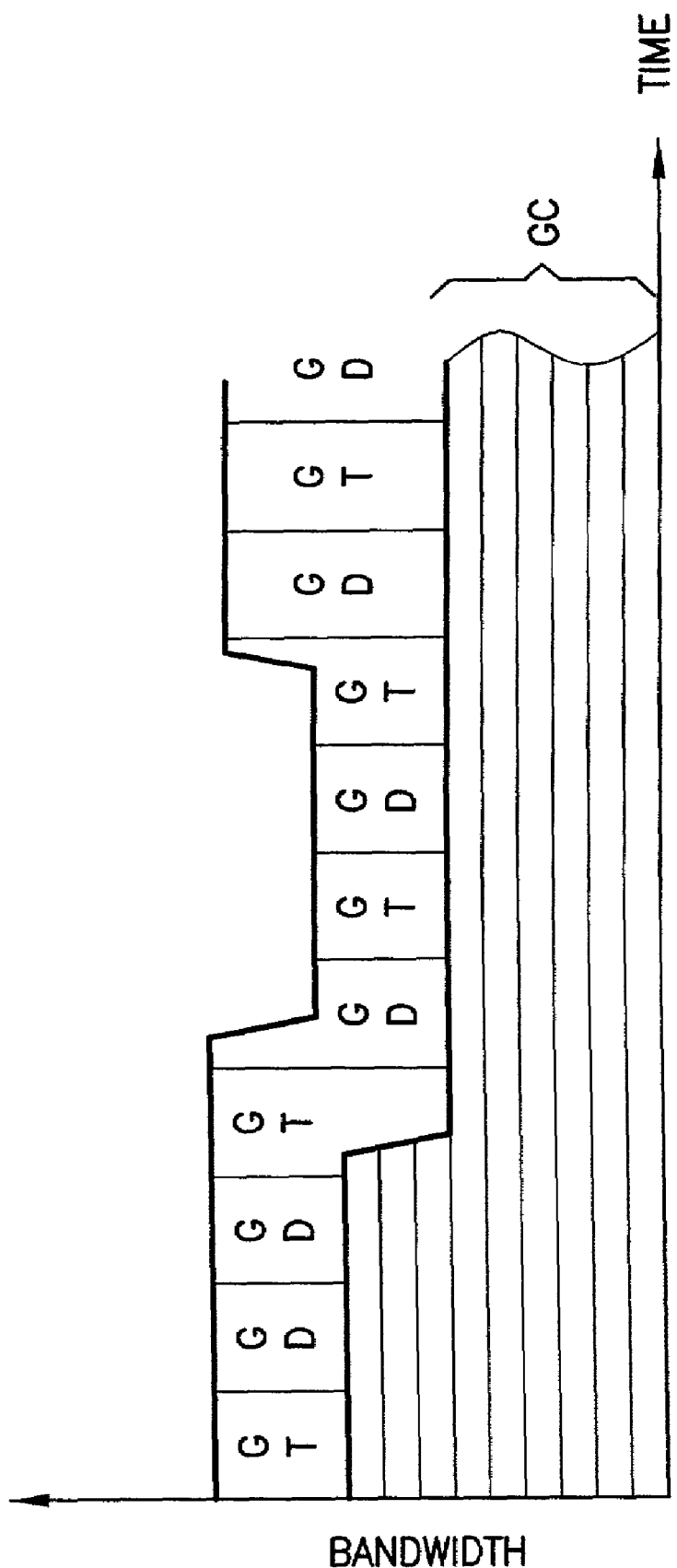
FIG. 7 shows an exemplary partitioning of bandwidth according to embodiments of the invention.

The fourth through sixth QoS types are "local/constant" (LC), "local/time-bound" (LT), and "local/dynamic priority" (LD). These QoS types analogous to the GC, GT, and GD types described above but are used for distribution within specific network areas rather than for global distribution. FIG. 7 shows an exemplary partitioning of final network availability into the GC, GT, and GD classes described above.

According to embodiments of the present invention, bandwidth of a certain QoS class that remains unassigned by a certain deadline might be reassigned so as to become bandwidth of another QoS class. For example, GC bandwidth that remains unassigned might be reassigned to become GT and/or LC bandwidth, GT bandwidth that remains unassigned might be reassigned to become GT and/or LT bandwidth, GD bandwidth which remains unassigned may be reassigned to become LD bandwidth, LC bandwidth which remains unassigned may be reassigned to become LT bandwidth, and LT bandwidth which remains unassigned may be reassigned to come LD bandwidth. The deadlines will generally be expressed in terms of time before transmission over the wireless link of the bandwidth in question. For example, the deadline for the reassignment of GC bandwidth might be 10 days before that bandwidth will be transmitted over the wireless link. As a further example, the deadlines for the reassignment of GT, GD, LC, and LT bandwidth might respectively be five days, two days, five weeks, and 1 day.

Bandwidth Selection by Content Providers

A content provider wishing to distribute content such as files, software, media, or the like using the distribution system of the present invention must first secure bandwidth for the distribution. As was described above, the total transmission bandwidth available in the DDS is split into a number of QoS blocks of varying lengths and bandwidths. According to certain embodiments of the present invention running on one or more computer of the DDS will be a scheduling intelligence module 1217, and a content provider may secure QoS blocks for a particular distribution using content provider software that interfaces with that module.

In one embodiment of the present invention, the interface may be custom software running on a computer used by the content provider. For example, the software could be written in Java and interface with the scheduling intelligence module using a technique such as SOAP (Simple Object Access Protocol), RMI (remote method invocation), or JMS (Java Messaging Service) over a data link between the content provider and the DDS. This link could be, for example, the internet or a private network. Alternately, the software could be written in Objective-C or Java and could interface with the scheduling intelligence module using the Distributed Objects functionality provided by Apple Computer's Cocoa frameworks. In another embodiment, a web browser could be used to interface with the scheduling intelligence module.

The web interface may be implemented as is known in the art using, for example, Java Server Pages (JSP) to update the web interface in accordance with the interaction with the scheduling system. In certain embodiments, the software or web browser interface may be constructed using Apple Computer's Web Objects.

The interface could allow a content provider to browse among available GC, LC, GT, and LT blocks and non-specific offerings of GD and LD blocks. In addition to selecting single blocks or GD or LD offerings, multiple blocks or offerings could be selected at a time. For example, a content provider could request blocks for a weekly distribution of a movie every Friday at 8 p.m. For such repeating distributions, the content provider could indicate whether the same content was to be distributed each time (such as a repeating infomercial) or if different content was to be distributed each time (such as new episode of a soap opera each week). If the same content is to be used each time, in some embodiments the content provider may only need to upload it once.

The scheduling intelligence module maintains a datastore noting all blocks and information concerning their assignment statues. Once blocks have been chosen by or on behalf of a content provider, the scheduling intelligence module's datastore is updated to reflect this by marking them as "reserved." For example, the datastore may have a "reserved bit" corresponding to each block, where the bit is set to "0" if the block is free and "1" if the block is reserved. The scheduling intelligence module next assigns and forwards to the content provider a unique identifier for each block. Thus for repeating distributions, only a single unique identifier will be forwarded.

Upload, Processing, and Distribution

After allocating scheduling blocks for distribution of the specified content, the scheduling intelligence module will request from the content provider the content to be distributed and metadata describing that content. The request may further include deadlines by which the metadata and content must be submitted. Generally speaking, the deadline for the submission of the metadata will be prior to the deadline for the submission of content.

The metadata may comprise a wide variety of information describing the content. For example, the metadata may include the unique identifier assigned by the scheduling intelligence module, the content type (e.g., film, application software, classified ad, video game, or music), whether a subscription is required for viewing, the running time, whether the content is for global distribution or distribution to a specified network area, the author, the transmission start time, the transmission end time, the expiration date, the genre, and/or the intended viewer or user age group of the content. In some embodiments the metadata may further include a summary or synopsis of the content. As will be explained in more detail below, this metadata is used for purposes such as compilation of a broadcast schedule and content filtering.

The scheduling intelligence module may request the upload of metadata in a number of ways. In one embodiment, metadata upload could be manual rather than automatic. For example, a dialog box reading:

"Begin upload of metadata for distribution #123456 when ready. Metadata MUST be uploaded before Aug. 12, 2001 @ 23:12:00."

may appear on the software of the content provider, where "#123456" is the above-noted "unique number" identifying the distribution. In some embodiments, when ready the content provider could select from the software's interface the command "enter metadata". In response the interface might display the query:

"Enter metadata for which distribution #?"

In response to which the content provider could enter the appropriate unique identifier (e.g., 123456). After content provider has entered the number, the interface might display a dialog box with two buttons, each representing a choice:

"Enter metadata by hand or load from file? [By Hand] [From File]"

If the content provider selected "by hand," the interface could present a form listing various metadata fields (e.g. "type" and "running time") for the content provider to fill out. If the content provider selected "from file", the interface could present a file browser from which the content provider could select from local and/or remote storage he file containing the desired metadata. The file might be, for example, in XML format.

After filling out the form or selecting the file, the content provider could select the command "Upload Now" from the interface. In response to this, the metadata could be transmitted to the scheduling intelligence module. In certain embodiments, instead of or in addition to the command "Upload Now" could be the command "Upload at specified time". By selecting this command, the content provider could select a specific time for the metadata to be transmitted.

Transmission of metadata to the scheduling intelligence module could be done in a number of ways. For example, a virtual private network (VPN) might connect the content provider to the DDS. In such a case, for example, a module of the software of the content provider might send a message to the scheduling intelligence module 1217 including the metadata, a specified "unique number", and a request that the included metadata be saved on the scheduling intelligence module's associated store with reference to the specified unique number. In some embodiments, this message could be sent using SOAP. In response, the scheduling intelligence module could appropriately store the sent metadata.

In cases where there is no VPN connection between the content provider and the DDS, additional steps might be necessary. For example, it might be necessary to configure a firewall 801 to allow entry of the message directed to the scheduling intelligence module. In such a case there might be a gatekeeper module 801 which would be capable of configuring the firewall to allow entry of the message. Accordingly, prior to sending the message specifying the metadata, a module of content provider software might send to the gatekeeper object a message requesting passage of a second message to the scheduling intelligence module. In some embodiments, the first message may further include an encrypted or unencrypted password and/or identification number relating to the content provider.

In one embodiment, in response to the message the gatekeeper module could configure the firewall to allow entry, wait for a message from the scheduling intelligence module indicating that the message including metadata had been successfully received, and then reconfigure the firewall to disallow further entry. Configuration of the firewall could be done, for example, by having the gatekeeper object make use of the Unix IPFW command or equivalents. In embodiments where the message to the gatekeeper included a password and/or identification number, the gatekeeper would verify credentials before altering the firewall.

As noted above, blocks allocated for distributing content are initially marked as "reserved" in the datastore of the scheduling intelligence module. As alluded to above, upon receipt of the metadata, the scheduling intelligence module alters its datastore so as to correlate the received metadata with the appropriate blocks.

In certain embodiments of the present invention, service announcements may periodically be sent to user terminals. Such service announcements may include the metadata for one or more distributions along with their corresponding unique identifiers. As will be described in detail later, such service announcements may be used for purposes including content filtering. In certain embodiments, the service announcements could be sent using the SAP (Service Announcement Protocol) and/or SDP (Service Description Protocol) protocols.

According to embodiments of the invention the scheduling intelligence module may provide for the transmission of a service announcement by sending a message to an appropriate caster module as indicated by the metadata to be sent via the service announcement. The message may include metadata for a particular distribution along with the corresponding unique identifier and a request that these items be "cast". The appropriate caster module will be a global caster module if the metadata indicates global distribution. On the other hand, if the metadata specifies distribution to a specific network area, the appropriate caster module will be the caster module corresponding to the specified area. The details of casting modules will be described in detail later.

Like metadata, non-live content must be uploaded by the content provider. For live media, such as a live video stream, the upload will occur approximately at the time broadcast over the wireless link is to occur. On the other hand, for non-live content upload may occur before broadcast time. Accordingly, for non-live content, the scheduling intelligence module determines the time at which content upload from the content provider will occur. The determination takes into account factors such as bandwidth and storage availabilities throughout the DDS at various times. In certain embodiments of the invention a content provider would be able to suggest an upload time to the scheduling intelligence module. The scheduling intelligence module would take this suggestion as an additional factor to consider during its determination of the upload time.

For example, in the case of non-live content the scheduling intelligence module may cause a message such as:

"Upload of content for distribution #123456 will occur Aug. 15, 2002 @ 11:12:00. Failure to meet this deadline may result in reassignment of bandwidth"

to be displayed upon the user interface of the content provider software. The content provider could take this as an indication that the specified non-live content would need to be ready for upload before that the specified point in time, and that the scheduling blocks designated for the content might be revoked if the deadline was not met. In certain embodiments, the content provider software would make note of the upload time.

In some embodiments, the content provider could make content ready for upload by choosing "select non-live content for future upload" from a menu of the content provider software. The content provider software could respond by asking the content provider for the corresponding unique identifier. After the content provider provided it, the content provider software could present the content provider with a file browser from which to select the file or files for upload. In some embodiments the content provider software could move these files to a specific storage location, such as an upload buffer associated with the content provider software. In alternate embodiments the content provider software could leave the files where they were, perhaps taking additional steps to make sure that the files would remain in that location and not be modified. For example, the content provider software could set the attributes of the files to prevent movement or other change, perhaps using the Unix command CHMOD, the Unix command CHFLAGS, or equivalents.

As stated above, the content provider software notes the upload time specified by the scheduling intelligence module. The content provider software may additionally monitor the time of day, waiting for the time of day to be equal to the upload time. When it is, the content provider software may initiate upload of the content by sending a message to temporary storage module 802 of the DDS using the data link between the content provider and the DDS. The message includes the content, the unique identifier, and a request that the content be stored. In some embodiments, the message may farther include a user id and/or password corresponding to the content provider. If there is not a VPN connection between the content provider and the DDS in a manner similar to that described above with reference to the upload of metadata the content provider software may first need to send a message to gatekeeper module 803 asking it to configure the firewall 801 to allow entry of the content. In cases where there is a VPN connection, this step may be unnecessary.

Upon receipt of the message, the temporary storage module 802 may store the content in its associated store. In embodiments where the message further contains a user id and/or password, the temporary storage module may first perform authentication by consulting a database module to verify the user ID and/or password.

A short time after the specified upload time for the content item or items, the scheduling intelligence module 1217 may send a message to the temporary storage module 802 including the unique identifier of the distribution in question, and asking if the corresponding upload has been received. If the temporary storage object responds with an answer of no (e.g., a message indicating Boolean false), the scheduling intelligence module may free for use by other content providers the schedule blocks that had been designated for the distribution.

At some later time prior to the intended transmission date for the content, the scheduling intelligence module 1217 may send a message to the temporary storage module 802 requesting that it pass the content to the preprocessor module. The message may further specify where the data should be stored after preprocessing. The specified store is the global store 813 for content to be distributed throughout the network. For content to be distributed only to a single network area the specified store is the local store corresponding to that area. As noted above, the scheduling intelligence module maintains in its associated store received metadata. The scheduling intelligence module makes the determination of which store should be specified by assessing its own associated store to consult the metadata corresponding to the distribution. The scheduling intelligence module chooses the time at which to send the message to the local store based on a number of factors such as the amount of available storage space associated with the temporary storage module, amount of data from other distributions that needs to be uploaded within a certain period of time, and the time remaining to transmission of the distribution in relation to which the message would be sent.

Upon receipt of the message from the scheduling intelligence module, the temporary storage module could comply with that message's request by sending a message to the preprocessor module 809. The message to the preprocessor module could include the content to be preprocessed, the corresponding unique identifier, and an indication of the target global or local store. The preprocessor module could perform tasks such as compression, format conversion, and addition of digital rights management (DRM) data. For example, the DDS may accept films in various formats such as Quicktime and Windows Media Player, but wish for them ultimately to be converted to Realmedia. In such a case, the preprocessor module would be programmed to determine the format of incoming video content and convert it to Realmedia format if necessary. Compression may, for example, include compressing incoming text or data files using a technique such as GNU Zip through use of the GNU gzip command or algorithm. In some embodiments, the preprocessor module may have an associated temporary storage location for use as a workspace while performing the above operations. Once it has completed its work, the preprocessor module may send a message to the global storage module or a local storage module as appropriate. The message can include the preprocessed content, the corresponding unique identifier, and a request that the content be stored with reference to its unique identifier.

At the determined time for transmission over the wireless link, the appropriate local or global storage module could receive from the scheduling intelligence module a message specifying a unique identifier, the rate at which the content should be transmitted over the wireless link, and a command specifying that the storage module should retrieve from its store the content corresponding to the unique identifier and request casting of that content for transmission over the wireless link at the stated rate. In some embodiments, the message may further include the metadata relating to the unique identifier and could further specify that the storage module request casting of the metadata along with the content. As alluded to above, the scheduling intelligence module can retrieve this metadata from its associated store. It is noted that in cases where the same content is to be transmitted over the wireless link more than once, the content may remain in the global or local store and the scheduling intelligence module may send the above-described message to the storage module at each point in time when the content is to be transmitted.

In response to the message, the storage module sends a message to its corresponding caster including content to be cast, the rate at which transmission over the wireless link is to occur, and requesting that the content be cast. By "corresponding caster" is meant, for example, that the global storage module 813 would send the message to the global caster 821 while the local storage module for area 1 (811) would send the message to the local caster for area 1 (819). In some embodiments the message might further include the corresponding metadata and might further request that the metadata be cast along with the content. The details of the casting module will be described in more detail below.

Like non-live content, live content, such as a live video feed, must also be uploaded to the DDS. In the case of live content the SS may cause a message such as:

"Live broadcast of content for distribution #123456 will occur Aug. 17, 2002 @ 14:14:00. Failure to meet this deadline may result in reassignment of bandwidth "

to be displayed upon the content provider software. For live content, such a message acts as a reminder of sorts since for live content upload time is equal to the transition time.

At some time prior to the transmission time, the scheduler intelligence module may send to the preprocessor module a message including the unique identifier corresponding to the distribution, the rate at which transmission over the wireless link will occur and, in some embodiments, the metadata relating to the distribution. The preprocessor module stores the received information in a related temporary store.

At the transmission time, the content provider software begins to accept input of the streaming media. The content provider software might receive the input, for example, by making use of APIs or frameworks which allow for capture of audio and/or video from interfaces located on the computer running the content provider software. The interfaces may include, for example, Firewire ports, line-level analog audio input ports, and NTSC or PAL analog video input ports. After each capture of a certain number of time units of audio or video (e.g., a certain number of frames of a video program), the content provider software may send a message to the preprocessor module 809. The message may include the unique identifier corresponding to the content, the freshly-captured video and/or audio segments, and a request for preprocessing of the segments. In cases where a VPN is not used to connect the content provider to the preprocessor module, the content provider software may first need to interface with a gatekeeper module as described above.

In response to the message, the preprocessor module may perform preprocessing of the segments in a matter analogous to that described above in relation to non-live content. The preprocessor module may further determine from the previously received corresponding metadata whether the content is for global distribution or for distribution to a particular network area. Based on the determination, the preprocessor module may send a message to the appropriate caster, the message including the segments to be cast, an indication of the rate at which transmission over the wireless link should occur, and a request that the segments be cast with the goal of performing transmission at the specified rate. In some embodiments the message might periodically further include the corresponding metadata and might further request that the metadata be cast along with the segments.

Casting, Brokering, and Transmission over the Wireless Link

As noted previously, the DDS of the present invention allows a content provider to specify, in metadata for example, that a particular distribution be a "global" distribution, that is one which is transmitted over the wireless link to all network areas, or that a particular distribution be a "local" distribution, that is one which is transmitted only to certain network areas. Content to be distributed is routed to either a global caster module or to a local caster module based on this specification.

Figure 8:
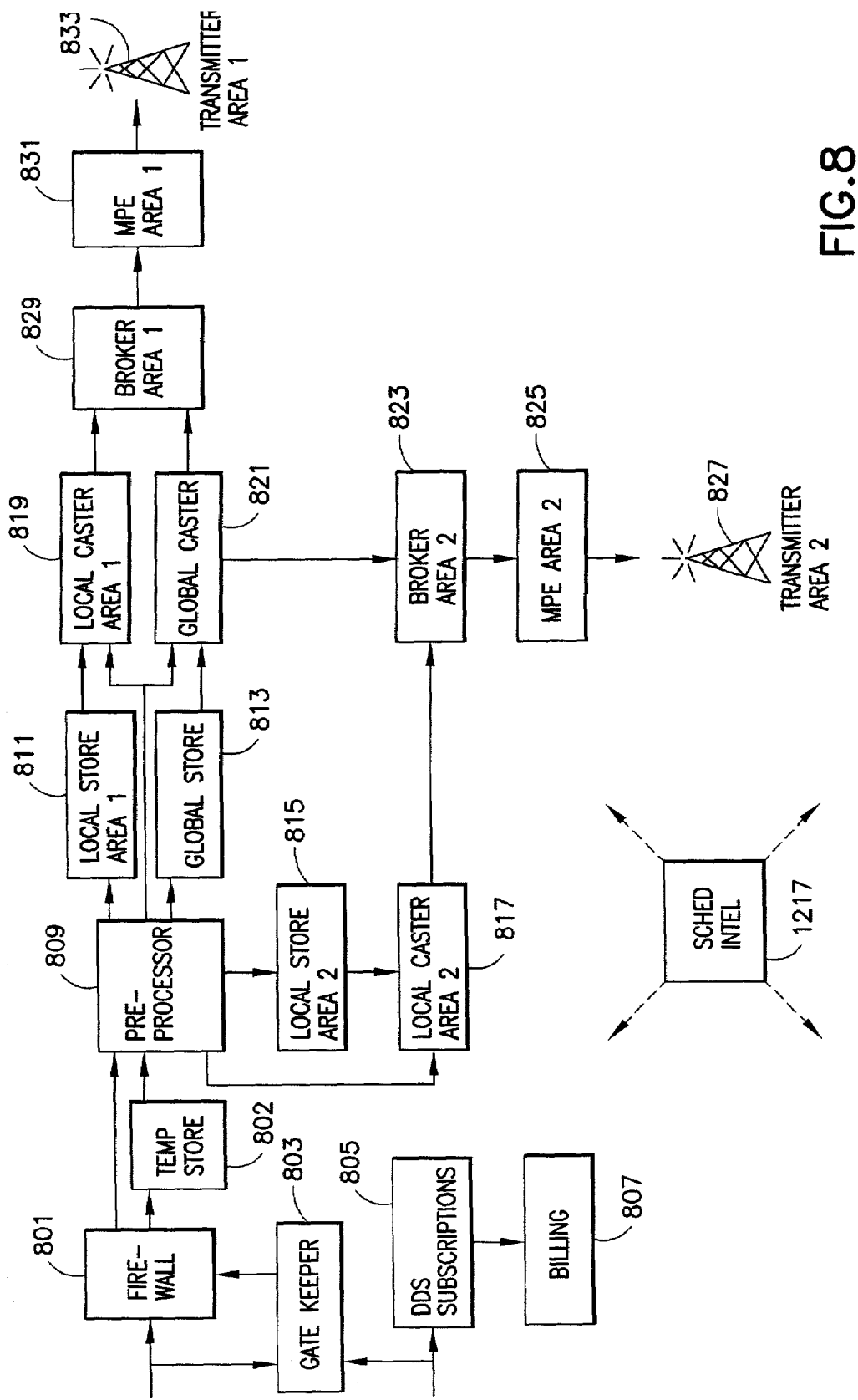
FIG. 8 software module view of an exemplary datacast distribution system according to embodiments of the invention.

As can be seen in FIG. 8, there is for each network area a broker module that receives messages from both a global caster module and the local caster module corresponding that area. For example, the broker module for area 1 (829) receives messages from global caster module 821 and the local caster module for area 1 (819). The broker module, in turn, sends messages to at least one multiprotocol encapsulation (MPE) module that is associated with wireless transmission equipment that serves that the broker's network area. For example, the broker module for area 1 (829) sends messages to the MPE module for area 1 (831). In cases where a network area comprises more than one cell, there is preferably an MPE module and transmitter for each cell.

Upon receipt of a casting message, the global caster object sends to each broker object a message including the metadata and/or content sent to it in the casting message, the message further requesting the transmission of that content and/or metadata. If a transmission rate was included in the casting message, the global caster object would request that the transmission occur at this rate. On the other hand a local caster module, upon receipt of a casting message, sends a message to its corresponding local broker module including the metadata and/or content sent to it in the casting message, the message further requesting the transmission of that content and/or metadata. For example, the local caster module for network area #2 would send to the broker for network area #2 a message requesting transmission. As above, if a transmission rate was included in the casting message, the local caster object would request that the transmission occur at this rate.

As alluded to above, the global caster object is required to send its message requesting transmission to a plurality of broker objects, one for each network area. One way to implement this is for the global caster object to keep track of all of the network area broker objects and send a message to each one in succession. Thus, for example, a message would be sent to the broker for network area 1 (829), then the broker for network area 2 (823), and so on. Alternately, a publish-subscribe messaging scheme may be used. For example, when using the Apple Computer Cocoa frameworks, the global caster object may, instead of passing a message to each local area broker, formulate the message into a NSNotification and send it to an NSDistributedNotificationCenter. All local area brokers could subscribe to such notifications by informing the NSDistributedNotificationCenter. The NSDistributedNotificationCenter, upon receipt of a notification from the global caster, would forward the notification to all of the subscribing brokers. Alternately, the JMS (Java Messaging Service) Publish/Subscribe API could used.

Upon receipt of a message requesting transmission, a broker object sends a message including the content, a specified transmission rate, and a request that the content be transmitted at the specified rate to its one or more associated MPE modules. The one or more MPE modules, in turn, packetize the received content for transmission over the wireless link using their associated transmitters. In embodiments where a broker module operates on a general purpose computer remote from the computer upon which its one or more associated MPE modules operate, link may be done in a number of ways known in the art including SOAP (Simple Object Access Protocol) and RMI (Remote Method Invocation).

According to embodiments, the operation of an MPE module may involve placing the received data into UDP packets, which are encapsulated within IP packets, which are in turn encapsulated into DVB packets. Details of this MPE technique may be found, for example, in standards documents EN 301 192 and EN 300 468. At the application layer, usable protocols include UHTTP (unidirectional HTTP), RTSP (Real-Time Streaming Protocol), and FTP. In certain embodiments, IP encapsulation may make use of IPSEC to ensure that content will only be usable by receivers with the appropriate credentials. During the encapsulation process, the above-described unique identifier may be added to at least one of the headers. For example, when UHTTP is used, the unique identifier may be encoded in the UHTTP header under the UUID field.

The DVB packets so produced are transmitted over the DVB-T wireless link as is known in the art. When a transmission rate is specified by the caster, that rate is adhered to. Where no rate is specified, as may be the case with service announcements, the system might be built to transmit such data at a predetermined rate.

It is noted that in certain embodiments particular multicast addresses may be associated with blocks. In such embodiments, receivers could make use of these multicast addresses when filtering. Thus a particular multicast address could be associated, for example, with a particular content item (e.g., a particular football match-up of Scotland vs. England) or with a particular content type (e.g. all live football matches).

Reception and Subscription

As described above, service announcements are periodically sent to reception terminals over the wireless link. In embodiments of the present invention, a terminal offerings module running on each terminal may save this data and use it to build a listing of available distributions of content. The terminal offerings module may associate with each listed distribution the unique identifier relating to that distribution. The terminal offerings module may interface with a GUI so as to present a browsable list of the offerings to a terminal user. Some content may be noted in the offerings list as being transmitted over the wireless link at a specific time (e.g., 12 Dec. 2002 at 1:23:12 p.m.), other content may be listed as being transmitted before a certain date (e.g., some time before 11 Dec. 2002), while other content might be listed with no suggestion or indication of time of transmission. The user may select items from this schedule for viewing, download, or the like.

When a content item is selected by the user, a terminal filter module running on the terminal notes the unique identifier relating to that distribution. The terminal filter module may then monitor incoming packets for that selection by looking for packets containing that unique identifier. Identified packets would be subject to further processing; for example if the packets contained streaming MP3 audio, this audio might be decoded and presented to the user.

In addition to having the terminal filter module watch for content chosen from the offerings list, a user may also have the terminal filter module monitor for content having certain properties. This may be achieved in several ways. In one embodiment, a user may specify that she is interested in content with corresponding metadata that possesses one or more specified properties. For example, a user might request that she is interested in all western television shows that are less than 30 minutes long. In response, the terminal filter module could look through the metadata of its collected service announcements to look for content matching the selected properties. The terminal filter module could then note the respective unique identifiers and monitor incoming packets for packets specifying one of the noted identifiers.

In another embodiment pattern recognition could be employed. For example, the terminal filter module might provide functionality by which a user could select a file, incoming stream, or other content item and ask the module to find similar items. For example, a user could select an MP3 format music file from her terminal's internal storage and ask that similar files be filtered for. In response, the terminal filter module could have a pattern recognition module create a neural network, using the selected music file as training data, that could be used to determine a level of similarity between new data fed into it and the data that was used to train it. Incoming packets which were determined to correspond to music files could then be decoded and sent to the pattern recognition module for processing using the neural network. Once a certain threshold of dissimilarity between the training data and the incoming data was determined, application level processing of packets related to that content item, as identified by the unique identifier, could cease unless reception of the corresponding content item was requested via another method such as from the offerings list or according to specified metadata attributes.

According to the present invention, in order for a user to access certain specific content items and/or certain types of content, subscription and/or purchase may be required. For example, a user wishing to receive all live concerts might need to subscribe to a "live concert service". Additionally a user might be able to subscribe to a sub-service such as "all live rock concerts" or to a specific distribution such as a particular rock concert.

For example, a user selecting an item from the offerings list might be told the viewing that selection would require her to purchase a subscription. In some embodiments, the user would be given several choices for purchasing a subscription. A terminal subscriptions module running on the user's terminal may maintain in an associated store a list of all possible subscriptions that the user is eligible to purchase, noting for each one whether that subscription has been purchased. For example, upon selection of a Jun. 22, 2002 live Joe Cocker rock concert from the offerings list, the terminal offerings module might query the subscriptions module to see if the user had purchased at least one subscription that would allow viewing of that concert. If the user had no eligibility to view the content, the subscriptions module could cause the following to be displayed upon the terminal screen:

"You are not currently entitled to view this program. Please indicate your selection:
I do not wish to purchase the right to view this program
I wish to purchase the right to view all offerings of the category 'live musical concert'
I wish to purchase the right to view all offerings of the category 'like rock concert'
I wish to purchase the right to view this program only"

If the user selected the second or third choice, she might then be asked the period of time for which she wished to subscribe.

In the case where the user selected a purchase, this request could be forwarded to the DDS subscriptions module 805, perhaps using SOAP over a GSM, satellite, landlink, or other return channel. In some embodiments the DDS subscriptions module 805 would compute the price of the purchase and forward it to the billing module 807 for verification of the user's ability to pay. The billing module might then access the user's credit card number on file and then contact a computer of the corresponding credit card company to receive authorization for a purchase of the appropriate amount. Once authorization was received, the billing module could inform the DDS subscription module of this fact. The DDS subscription module could then prepare for transmission to the user one or more access keys corresponding to the subscriptions purchased. In some embodiments, the user would not be billed until the access key or keys were distributed.

As noted above, IPSEC may be used during the multi-protocol encapsulation of content which requires subscription. The access key which will be sent to the user who purchases a particular subscription would the key that, according to the IPSEC protocol, would allow use of the content so encapsulated. For cases where a subscription corresponds to a single event, download or the like, such as subscription to view a particular rock concert, the access key will only be useful for the viewing of that particular event and thus may not need to possess a particular expiration date since the key is inherently worthless once the event is over. On the other hand, for subscriptions which span multiple individual distributions, such as a subscription for all live musical concerts, the access key would likely be set to expire.

In some embodiments, a key for a particular service might only be valid for a day. In such a case a user might receive each day for the period of time which she chose to subscribe, a new key corresponding to the service. At the end of the chosen subscription period keys would no longer be distributed to the user, therefore preventing her from viewing content she did not pay for.

The shorter the period of time that is selected for keys to be valid, the more choice the user has as to her subscription period. For example, if keys are selected to be valid for a day, the subscription period chosen by the user can only have a resolution of one day. Thus, a user could request a six-day subscription period but not a six-days-and-five-hours subscription period. On the other hand, if it were decided that keys would be valid for only an hour, the user could choose subscription periods with a resolution of one hour. Thus a user could choose a six-days-and-five-hours subscription period.

Figure 9:
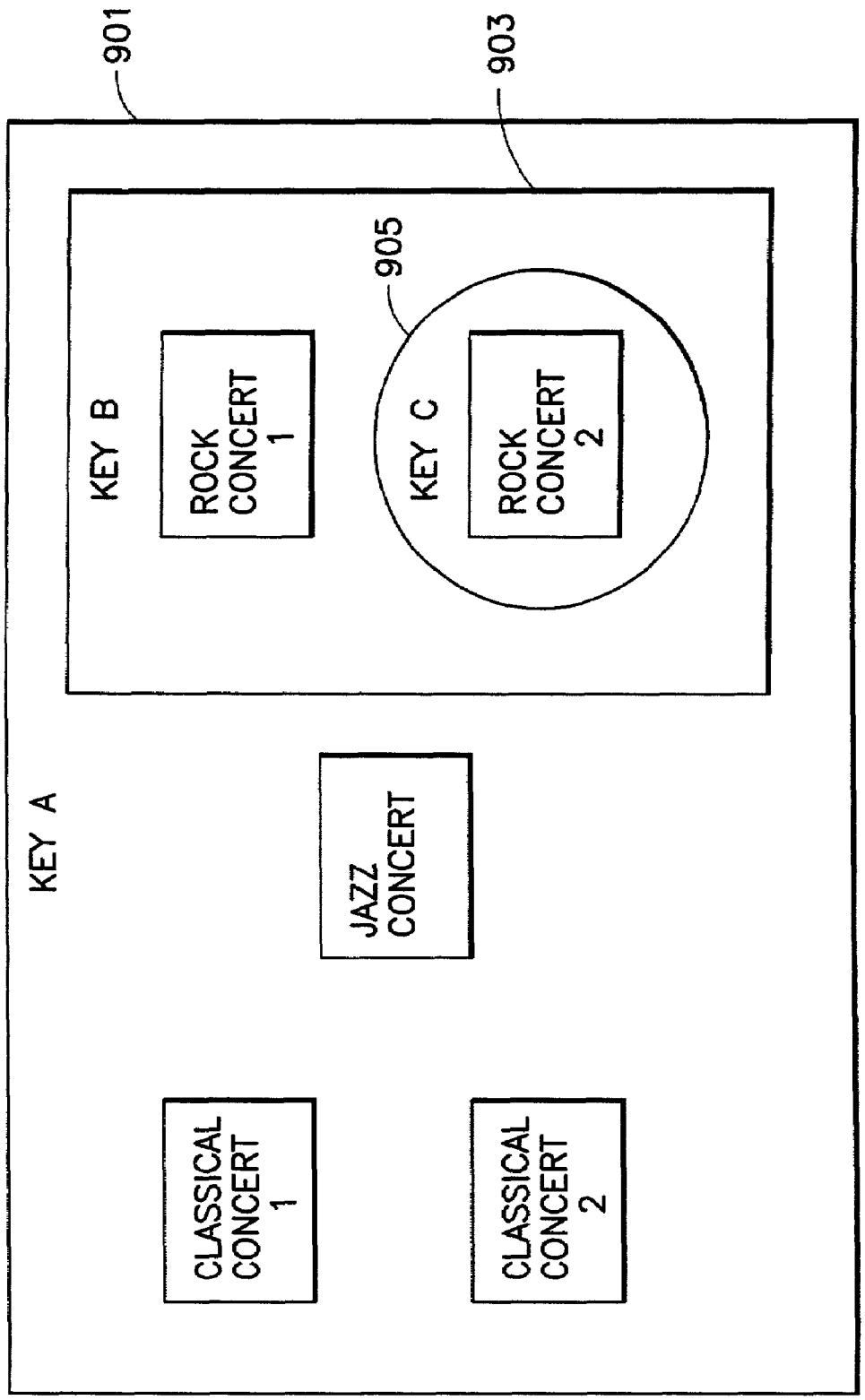
FIG. 9 shows exemplary scope of three access keys according to embodiments of the invention.

Furthermore, according to the present invention access keys may possess skeleton key functionality. The spirit of this functionality is shown in FIG. 9. In this example, access key A allows access to all live musical concerts. Access key B allows access all live rock concerts and therefore allows access to only a subset of the distributions key A allows access to. Access key C allows access to only one particular rock concert, and thus allows access to a one-member set which is a subset of both the set of distributions key A allows access to and the set of distributions key B allows access to.

Before an access key is sent to a user terminal, it is preferably encrypted such that two other keys are needed at the user terminal to perform its decryption. The first key as a terminal key 1005 which is preferably permanently built into the hardware of the terminal. The second is a user key 1001. The user key is, for example, given to the user when he initially activates his terminal. Thus it may be required that users activate their terminals at the store at which they purchase them, and that the store load the user key onto the device. In another embodiments, the user key could be distributed on removable media such as a compact flash or MMC (multimedia card) that is readable by the terminal.

An encrypted access key may be distributed in a number of ways. In one embodiment, the DDS subscriptions module 805 might send a message to the caster corresponding to the network area in which the purchasing user is currently located. The message could include the encrypted access key, metadata including a customer number and an indication that a key is included, and a request that the key and metadata be transmitted over the wireless link. The caster could take steps analogous to those described above to comply with the request. The terminal filter module could watch for the key by monitoring for packets whose metadata stated the customer's user ID and that a key was being transmitted. Alternately, the key could be transmitted via an alternate link such as by GSM.

Figure 10:
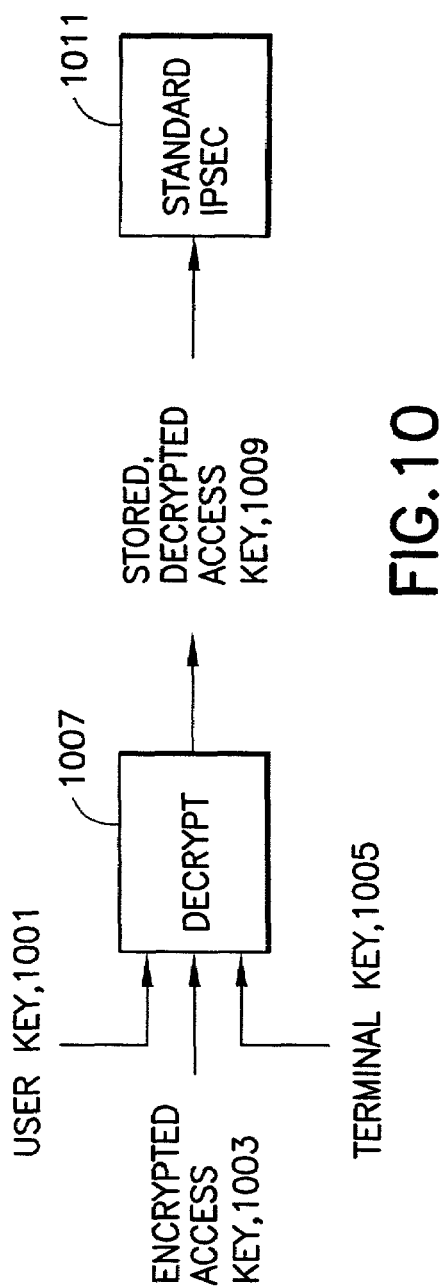
FIG. 10 shows the use of the standard IPSEC protocol.

In a preferred embodiment, a custom form of the IPSEC protocol is used in deincapsulation at the client terminal. According to the standard IPSEC protocol known in the art (see FIG. 10) decryption of the data payload of IP packets requires the use of a decrypted or unencrypted access key. This would require that the decrypted or unencrypted access key be stored on the terminal, and offers a high potential for piracy because the access key could be downloaded off the terminal and distributed to non-paying users.

Figure 11:
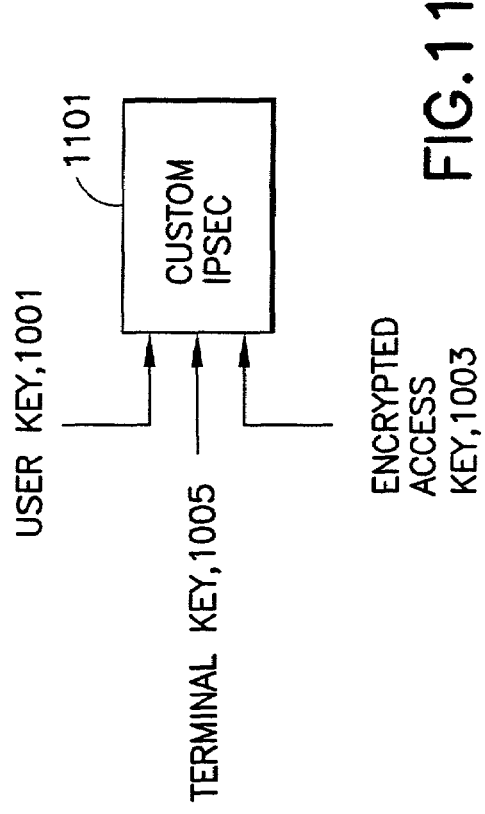
FIG. 11 shows the use of the custom IPSEC protocol of embodiments of the invention.

This problem is addressed by use of the custom IPSEC protocol of an embodiment of the present invention. As seen in FIG. 11, according to this custom protocol the code for decrypting the access key 1003 with the user key 1001 and terminal key 1005 is part of the IPSEC handling code. Therefore, instead of first decrypting the access key 1005 and then feeding this key to the IPSEC handling code, the access key, user key, and the terminal key are simultaneously applied to the custom IPSEC handling code. The custom IPSEC handling code decrypts the access key using its own internal decryption code and then applies the resultant decrypted key to decrypt the payload of the IP packets. In certain embodiments, the resultant decrypted key may be destroyed immediately after its application using data destruction techniques known in the art. Furthermore, in certain embodiments the custom IPSEC handling code simultaneously decrypts the access key and uses it to decrypt the packet payloads.

As alluded to above, this method helps avoid piracy by keeping the decrypted access key from existing in an accessible storage area on the device. According to certain embodiments of the invention, all encrypted access keys that the user is in possession of are simultaneously applied to the IPSEC handling code along with the user key and terminal key. In other embodiments, the terminal would apply only one encrypted access key at a time. In such an embodiment the terminal could be notified of, or be able to determine, the appropriate key to use. Alternately, the terminal could apply all possessed encrypted access keys in succession.

It has been described herein that a user may purchase a subscription upon attempting to select a content item from the offerings list that requires a subscription that the user does not possess. Alternately, a user might select from the interface of her terminal the command "purchase subscriptions." Selection of this command could cause the terminal subscriptions module to consult its associated store to determine which of the subscriptions that the user is eligible to purchase that the user has not yet purchased. The subscriptions module may then cause the display of the terminal to list a menu noting the name, price, and/or a short description of each not-purchased subscription. The user could then select from the screen the subscription she wished to purchase. Handling of the user's purchase selections could be handled as above.

Content Voting

According to one embodiment of the present invention, users may be able to vote among several content selections for what will be transmitted over the wireless link For example, a content provider might reserve transmission bandwidth with the scheduling intelligence module as described above, but further indicate that users should choose from among two or more indicated selections for the actual transmission. In some embodiments the content provider would be asked to upload to the DDS all possible selections.

In certain embodiments, the scheduling intelligence module might have service announcements sent out such that a certain selection in the terminal offerings list could indicate:

"* Saturday Night Sci-Fi Cinema *

Vote for your choice as to which film will be transmitted at 8 p.m. this Saturday. Voting ends Wednesday at midnight. The choices are:

Star Wars

Star Trek II

Star Trek IV"

A user's selection could be sent over a GSM or other bi-directional link as a message to the scheduling intelligence module 1217. In certain embodiments, the message would additionally include an identifier such as the user's customer number. At the end of voting, Wednesday at midnight in this example, the scheduling intelligence module would tally the received votes to determine the winner. In embodiments which forwarded a unique identifier, the scheduling intelligence module would monitor for multiple votes from one individual by checking the user IDs associated with incoming votes. Duplicate votes could be dealt with by not counting any of them, only counting the first, or by implementing some other policy. However, it is noted that in certain embodiments a user may be allowed to vote for more than one content item. For example, in an alternate embodiment the above example would allow the user to vote for which two of Star Wars, Star Trek II, and Star Trek IV should be shown back-to-back as a double feature.

Furthermore, in certain embodiments, votes may be used to determine the order in which content items are transmitted. Therefore, in an alternate embodiment above example would ask a user to vote as to which of the three films she would like to see first. Once all votes were received, for example, it could be determined that the film receiving the most number of votes could be transmitted first, the film receiving the second highest number of votes could be transmitted second, and the film receiving the lowest number of votes could be transmitted third.

In still other embodiments, votes would determine both order of transmission and what subset of a plurality of content items could be shown. Thus, for example, a content item receiving the most number of votes could be transmitted first, a content receiving the second highest number of votes could be transmitted second, and all offered content items could not be transmitted at all.

It is noted that in certain embodiments a user may be able to view previews, such as video clips, corresponding to one or more of the offered items. Thus, continuing with the above example, a user might be able to view previews corresponding to Star Wars, Star Trek II, and Star Trek IV. Additionally, a graphical user interface may provide a voting button integrated with each preview. By pressing the button in the manner appropriate for the particular GUI used, a user may enter his vote for the film corresponding to the preview with which the button is associated.

In some embodiments where the content provider had uploaded all possible selections, the scheduling intelligence module would take steps analogous to those described above to have the chosen selection transmitted over the wireless link. In embodiments where the content provider had not been asked to upload all selections, the content provider would be notified to upload the winning selection.

EXAMPLES

Game Distribution

According to one embodiment of the present invention, the DDS may be used for the distribution of video games. For example, a content provider may secure for game distribution the QoS blocks shown in FIG. 13. For this example distribution will be global, although in practice a content provider might instead choose to distribute to only a certain network area.

Figure 13:
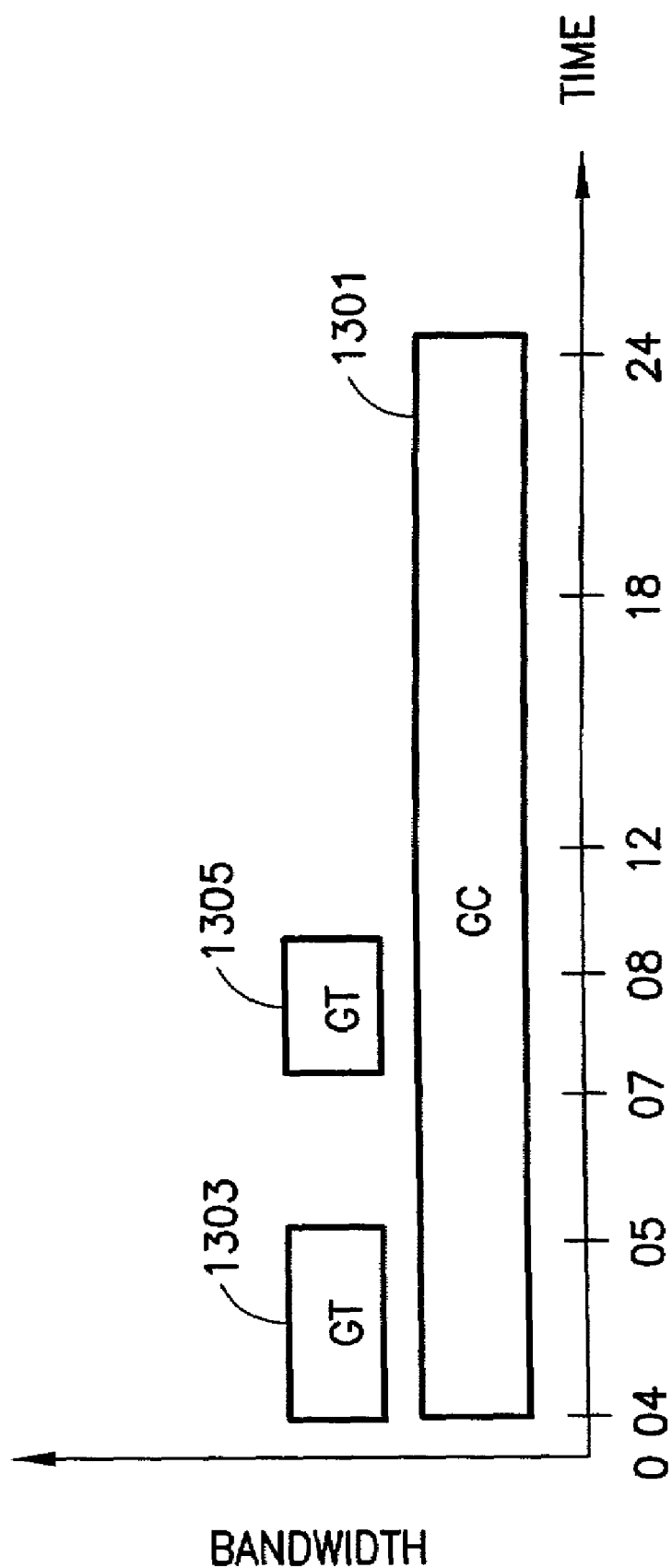
FIG. 13 shows an exemplary selection of bandwidth blocks by a content provider according to embodiments of the invention.

As seen in the example of FIG. 13, the content provider has secured GC (global constant) bandwidth and GT bandwidth (global time-bound). The example of FIG. 13 is intended to represent the daily bandwidth allocations for the service. In other words, FIG. 13 shows the allocations for one day, but in this example the same allocations are used daily for some period of time.

The GC bandwidth in this example is being used for the distribution of "10 popular games". A carousel distribution technique is used wherein the 10 games are repeatedly transmitted in succession. Thus each of the ten games would be transmitted in succession, and after transmission of the tenth games the first would be transmitted and the cycle would repeat. A user wishing to download one of the games would make the appropriate selection on the offerings list, and the game would then be downloaded to his device the next time it came up for transmission in the carousel.

The GT bandwidth is being used for distribution of new games. This distribution also uses a carousel technique. However in contrast to the 10 popular games carousel that rotated constantly, this carousel cycles only between 4 a.m. and 5 a.m. and again between 7 a.m. and 8 a.m. These times were chosen by the content provider, as is the procedure for the selection of GT bandwidth. Like selection from among the "10 popular games," a user selecting one of the games distributed in this manner from the distribution list would receive it the next time it came up in the carousel. However, because the carousel does not cycle constantly, a user making his request after 8 a.m. on a given day would have to wait until at least 4 a.m. the next day to receive the file.

Although video games have been discussed in this example, analogous procedures can be used for the distribution of video clips, magazines, books, music, and the like. Distributing need not be limited to distribution of one type of media and/or file. For example, games, movies and magazines could be simultaneously distributed. Furthermore, in certain embodiments the upload process by which the games are submitted to the DDS could include the addition of DRM (digital rights management) attributes to the files using techniques known in the art. DRM attributes could add properties to the files such as expiration date and the inability to function on other than the device that they were initially downloaded to, and/or upon the device of the individual who purchased the file by way of subscription.

Classified Advertisements

Another service which may be offered according to the present invention is a classified advertisements service. According to one embodiment of such a service, reception terminals could have software that allowed their users to construct classified advertisements. The software could allow users to select either global distribution or distribution to a particular network area. The software might also ensure that that constructed classified advertisement be in a form compatible with the above-described filtering functionality of the terminal. One way of doing this would be to require the user creating a classified advertisement to fill in certain fields describing the advertisement. For example, the user might be required to specify an "advertisement type" field by selecting from choices such as "personal advertisement," "real estate," "automobile for sale," and the like. Alternately, the software might scan an advertisement written free-form by the user for certain keywords, and automatically populate the fields based on the scan. In certain embodiments the fields created by either of these techniques could be used to create metadata which would be associated with the ad.

The advertisement so created, along with any metadata, could be sent from the software to a content provider that posted classified advertisements on behalf of users. This could be done, for example, using a SOAP connection between a software module of the advertisement-creating software and a software module running on one or more computers at the content provider. The content provider could then take steps analogous to those described above to request that the classified advertisement be transmitted over the wireless link.

Terminals could use the filtering functionality described above to search for certain advertisements. For example, a user could specify that the terminal bring to his attention all advertisements selling a used Honda Civic for less than $2000. The filtering module of the terminal could comply with the request by monitoring the metadata and/or content of incoming classified advertisements in a manner analogous to that described above.

Chat Service

Chat messages could be distributed in a manner similar to that described above with reference to classified advertisements. Thus according to one embodiment of such a service, reception terminals could have software that allowed their users to construct chat messages. Such chat messages could be messages starting a new discussion threads or messages responding to already-posted messages and/or already-established discussion threads.

The software could allow users to select either global distribution or distribution to a particular network area. The software might also ensure that that constructed chat message be in a form compatible with the above-described filtering functionality of the terminal. One way of doing this would be to require the user creating a chat message to fill in certain fields describing the message. For example, the user might be required to specify an "message type" field by selecting from choices such as "City Nightlife," "High School Homework-Help," "Macintosh OS X," and the like. Alternately, the software might scan a message written free-form by the user for certain keywords, and automatically populate the fields based on the scan. In certain embodiments the fields created by either of these techniques could be used to create metadata which would be associated with the message.

The message so created, along with any metadata, could be sent from the software to a content provider that posted messages on behalf of users. This could be done, for example, using a SOAP connection between a software module of the message-creating software and a software module running on one or more computers at the content provider. The content provider could then take steps analogous to those described above to request that the chat message be transmitted over the wireless link.

Terminals could use the filtering functionality described above to search for certain messages. For example, a user could specify that the terminal bring to his attention all chat messages concerning statistical analysis using Excel for OS X. The filtering module of the terminal could comply with the request by monitoring the metadata and/or content of incoming chat messages in a manner analogous to that described above.

As alluded to above, a user receiving a message could use a similar procedure to respond to that message. In certain embodiments, when a message is created to response to a posted message, the software might take steps to ensure that some or all of the metadata associated with the response message matches the metadata of the message to which the response is being made.

System Distribution and Scalability

As noted above, FIG. 8 shows the DDS in terms of various programmatic modules. According to the present invention, by choosing the number of such programmatic modules in operation, the number of computers upon which the modules run, and the physical location at which those computers are located, a scalable DDS may be provided. This concept will now be described by way of example with reference to FIG. 12. Communication between modules could be achieved using techniques such as SOAP, RMI, and Apple Computer's Distributed Objects.

As alluded to above, an embodiment of the DDS of the present invention includes several network areas. For network areas 2 and 3 of FIG. 12, the local storage modules (1201 and 1203 respectively) and local caster modules (1205 and 1207 respectively) operate on general purpose computers located at DDS headquarters 1200. On the other hand, for network area 1 the local storage module 1209 and local caster module 1211 operate on general purpose computers located near the network area. In certain embodiments, also operating on general purpose computers located near network area 1 might be a gatekeeper module, upload store module and/or preprocessing module. Such functionality could allow uploads meant for distribution only to local area 1 to be uploaded directly to the general purpose computers located near network area 1 rather than to the general purpose computers of DDS headquarters.

Figure 12:
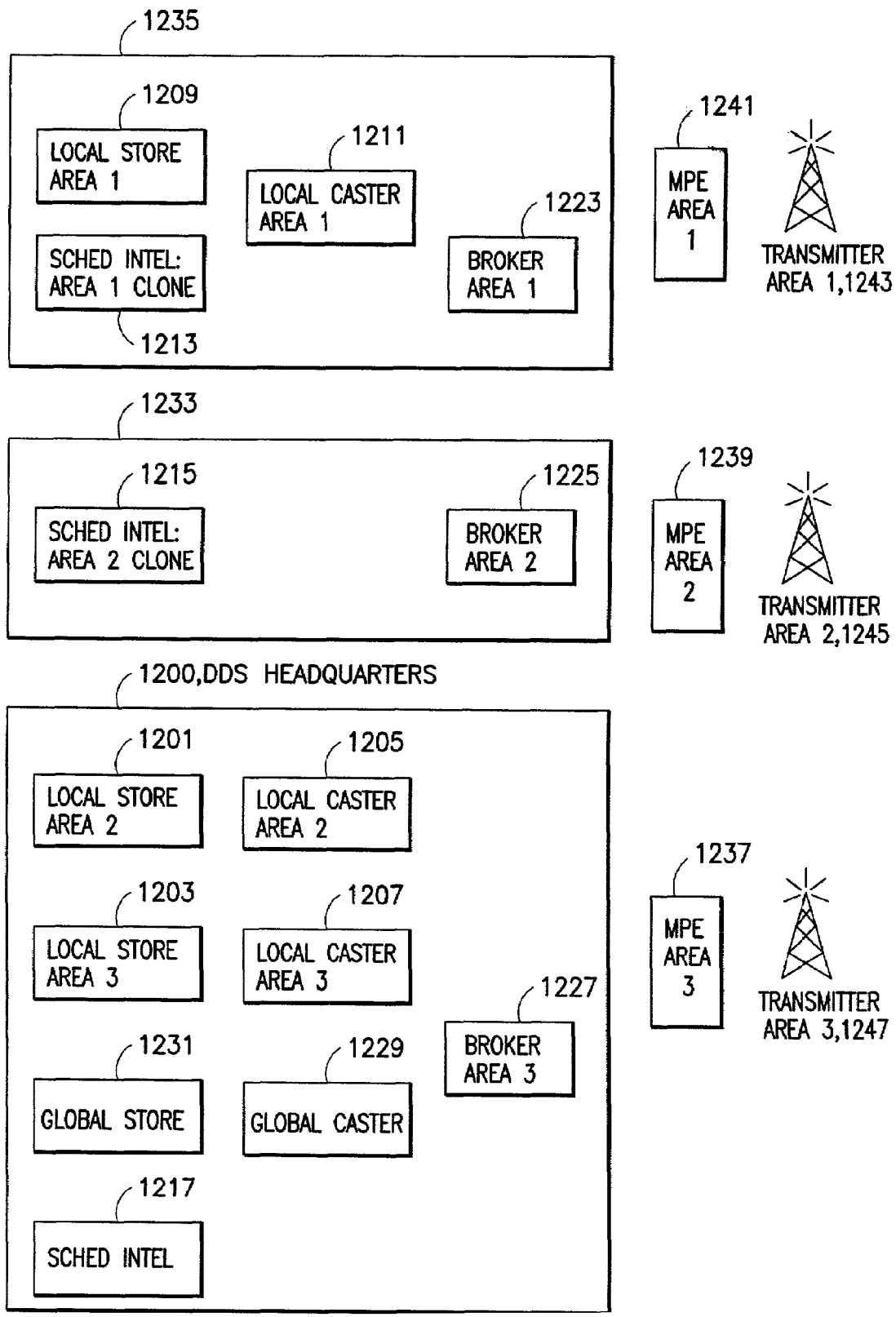
FIG. 12 shows an example of scalability of the DDS according to embodiments of the invention.

Turning to broker modules, we see that the broker module for network area 3 (1227) operates on one or more general purpose computers located at DDS headquarters while the broker modules for network areas 1 and 2 (1223 and 1225) operate on general purpose computers located near their respective network areas. Furthermore, as shown in FIG. 12, network areas 1 and 2 each have a locally-located clone (1213 and 1215 respectively) of the scheduling intelligence module and its associated storage. The associated stores of the clones may be made to reflect the associated store of main scheduling intelligence module 1217 of DDS headquarters by use of replicated server techniques known in the art. For example, the main scheduling intelligence module could propagate to the clones changes and additions to its datastore as they occur or, in other embodiments, at periodic intervals.

Although this example has described modules running on computers located near certain network areas, it is specifically noted that in certain embodiments the computers may be located elsewhere. For example, with growth of the system it might be desirable to add additional modules to expand the capability of the headquarters. In such a case the additional modules may run on additional general purpose computers that are located at or near DDS headquarters rather than at or near the network areas.

Hardware and Software

The software, modules, objects, components and other code and/or software elements described above could be written, for example, using an object-oriented language known in that art such as Objective-C, Java, or C#. Phrases such as "component," "module," and "object," as used herein, may refer, for example, to program code written as a class using an object-orientated programming language and instantiated into an object using techniques known in the art of object-orientated programming.

The modules or other software could run, for example, on computers including personal computers or workstations such as Power Macintosh G4s or Dell Dimensions running operating systems such as Apple OS X, Microsoft Windows XP, or Linux, perhaps further including support for Java. The modules or other software could also run, for example, on PDAs, cellular telephones, DVB-T receivers, or the like running an operating system such as Microsoft Windows CE or Symbian EPOC, perhaps with support for Java. Speaking, more generally, the modules or other software could run on a general purpose computer.

Figure 14:
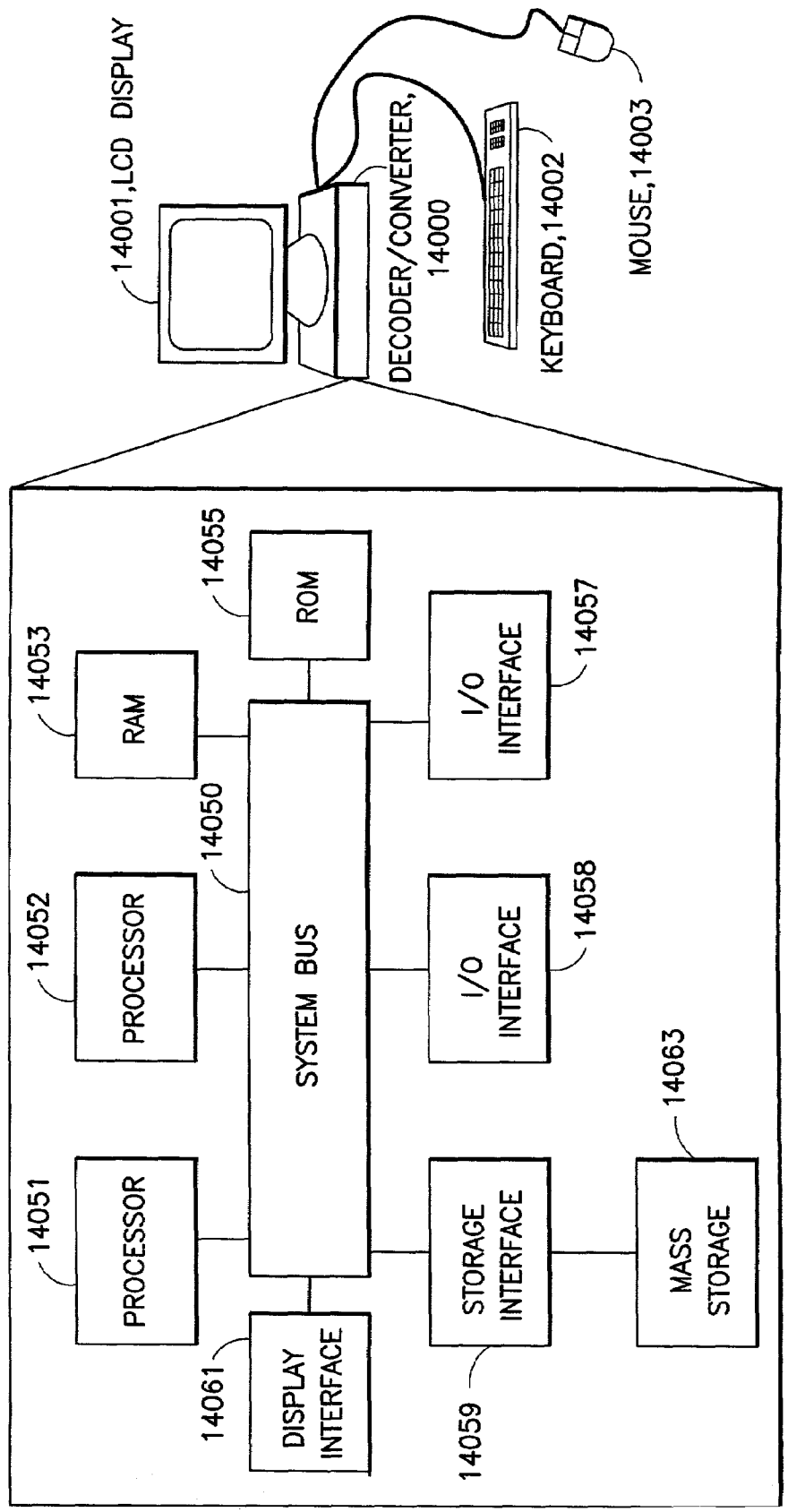
FIG. 14 shows an exemplary general purpose computer.

The phrases "general purpose computer," "computer," and the like, as used herein, refer but are not limited to an engineering workstation, PC, Macintosh, PDA, web-enabled cellular phone and the like running an operating system such as OS X, Linux, Windows CE, Windows XP, Symbian EPOC, or the like. The phrases "general purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 14000 as shown in FIG. 14 includes system bus 14050 which operatively connects two processors 14051 and 14052, random access memory (RAM) 14053, read-only memory (ROM) 14055, input output (I/O) interfaces 14057 and 14058, storage interface 14059, and display interface 14061. Storage interface 14059 in turn connects to mass storage 14063. Each of I/O interfaces 14057 and 14058 may be an Ethernet, IEEE 1394, IEEE 802.11, or other interface such as is known in the art. Mass storage 14063 may be a hard drive, optical disk, or the like. Processors 14057 and 14058 may each be a commonly known processor such as an IBM or Motorola PowerPC, or an Intel Pentium.

Computer 14000 as shown in this example also includes an LCD display unit 14001, a keyboard 14002 and a mouse 14003. In alternate embodiments, keyboard 14002 and/or mouse 14003 might be replaced with a pen interface. Computer 4000 may additionally include or be attached to card readers, DVD drives, or floppy disk drives whereby media containing program code may be inserted for the purpose of loading the code onto the computer. In accordance with the present invention, computer 14000 may be programmed using a language such as Java, Objective C, C, C#, or C++ according to methods known in the art to perform those operations described above.

Accordingly, the above described user terminal could be, for example, a portable device comprising a StrongARM processor, an integrated touch-sensitive color screen with the ability to receive DVB-T broadcasts and, in some embodiments, the ability to send and receive GSM, PCS, or other cellular transmissions. The device could use an operating system such as Microsoft Windows CE or Symbian EPOC, perhaps with support for Java.

As noted above, the bandwidth of an incoming DVB-T datastream is approximately 22 Mbit/s. In certain embodiments a user might view content using a general purpose computer or other device that interfaces with a DVB-T receiver via a data connection whose bandwidth is less than 22 Mbit/s. This could be the case, for example, if a personal computer interfaced with a DVB-T receiver using a data connection such as a Universal Serial Bus (USB) interface, as USB offers a bandwidth on the order of 5 Mbit/s.

Under such circumstances, it may be desirable to have the DVB-T receiver partition incoming data into channels of narrow enough bandwidth to fit though the USB or other data connection. Different partitioning models are envisioned.

According to one embodiment, the receiver could break the incoming DVB-T datastream into channels of identical bandwidth, each possessing bandwidth equal to approximately the bandwidth of the data connection. As noted above, the bandwidth of a USB data connection is approximately 5 Mbit/s. Therefore a 22 Mbit/s datastream could be broken down by the receiver into 5 channels of 4.4 Mbit/s each. Such partitioning would allow only one such channel to be transferred over the data connection at a time.

According to another embodiment, the receiver could break the incoming DVB-T datastream into channels of identical bandwidth, each possessing bandwidth equal to a small percentage of the bandwidth of the data connection. Thus, for example, when the data connection is a USB connection, a 22 Mbit/s DVB-T datastream could be broken down by the receiver into 88 channels of 250 kbit/s each. Such partitioning would allow a plurality of channels to be transferred over the data connection in parallel. Continuing with the example, a personal computer connected via USB to the receiver would be able to take as input 20 of the 250 kbit/s channels in parallel.

In yet another embodiment, the receiver could break the incoming DVB-T datastream into channels of differing bandwidths. For example, the receiver could break a 22 Mbit/s datastream into five channels of 1 Mbit/s, 10 channels of 500 kbit/s, and 48 channels of 250 kbit/s. Such partitioning would also allow a plurality of channels to be transferred over the data connection in parallel. Continuing with the example, a personal computer connected via USB to the receiver would be able to take as input, in parallel, two channels of 1 Mbit/s, two channels of 500 kbit/s, and 8 channels of 250 kbit/s.

The fact that the channels received in parallel are of differing bandwidth offers advantages such as allowing operation to be tailored to fit user needs. For example, if a user is downloading a plurality of software packages, all channels could be 1 Mbit/s channels. If a user is reading a plurality of classified ads or messages, all channels could be 250 kbit/s channels. If, on the other hand, the user is simultaneously reading messages and downloading software, some channels could be 1 Mbit/s channels while others could be 250 kbit/s channels. Functionality such as this may be useful, for example, when the receiver performs filtering of the sort described above.

According to such embodiments, the receiver could perform the above-described filtering on the incoming DVB-T datastream. The content determined to be of interest to the user could be distributed to the user's personal computer or similar device over the data connection using the above-described channels.

An additional advantage of this functionality is that processing power in the personal computer or similar device is conserved. If all 22 Mbit/s of the incoming DVB-T datastream were forwarded to the computer, the computer's processor would need to expend cycles processing open IP streams dealing with all or most of the incoming blocks—even if these blocks dealt with content that was to be filtered out. In contrast, when filtering is performed by the receiver unit in the way described here, only the content of interest is forwarded to the computers over the data connection. Thus the processor only deals with open IP streams relating to this forwarded content and processor cycles are not wasted on IP streams related to blocks that are not of interest. Cutting down on processor use can mean power conservation. Power conservation can be particularly important with portable devices running off of battery power.

What is claimed is:

1. A system for the distribution of content over a wireless link using new and existing terrestrial digital video broadcast networks, comprising:
    one or more global caster modules, wherein each of the global caster modules receives content to distribute to all locations in a network;
    one or more local caster modules, wherein each of the local caster modules receives content to distribute to only certain locations in said network; and
    one or more datacast transmission devices associated with at least one of the modules, wherein the network utilizes bandwidth partitioning and allocation to optimize bandwidth by use of the global caster modules and the local caster modules,
    wherein the partitioning is based on day-type profiles that are mapped to calendar dates,
    wherein blocks are allocated based on bandwidth monitoring periods and deployment period blocks,
    wherein a bandwidth monitoring period determines time when free bandwidth is available,
    wherein based on the bandwidth available and day-type profiles one or more deployment blocks corresponding to one or more content providers are marked as reserved, and
    wherein one or more assigned identifiers corresponding to one or more of the deployment blocks are forwarded to one or more of the content providers.

2. The system of claim 1, further comprising:
    one or more broker modules, each broker module receiving content from at least one local caster module and at least one global caster module.

3. The system of claim 2, wherein:
    each of said one or more transmission devices is associated with one or more of said broker modules.

* * * * *